(12) United States Patent
Gulli

(10) Patent No.: US 8,267,317 B1
(45) Date of Patent: Sep. 18, 2012

(54) SYSTEM AND METHOD FOR MANAGING AND MONITORING THE DISPENSING OF FUELS

(76) Inventor: Paul Gulli, Phoenix, AZ (US)

(*) Notice: Subject to any disclaimer, the term of this patent is extended or adjusted under 35 U.S.C. 154(b) by 674 days.

(21) Appl. No.: 12/316,885

(22) Filed: Dec. 17, 2008

Related U.S. Application Data

(60) Provisional application No. 61/008,982, filed on Dec. 20, 2007.

(51) Int. Cl.
| G06F 19/00 | (2006.01) |
| G06F 7/08 | (2006.01) |
| G06Q 30/00 | (2006.01) |
| G06Q 90/00 | (2006.01) |
| G06Q 10/00 | (2006.01) |
| G07B 17/00 | (2006.01) |
| G07F 19/00 | (2006.01) |

(52) U.S. Cl. ............. 235/385; 235/381; 705/28; 705/30
(58) Field of Classification Search .................. 235/375, 235/385, 381, 382, 383, 384; 705/28–30, 705/14.24, 14.36–14.38
See application file for complete search history.

(56) References Cited

U.S. PATENT DOCUMENTS

| 4,490,798 A | * | 12/1984 | Franks et al. | 700/283 |
| 5,605,182 A | * | 2/1997 | Oberrecht et al. | 141/94 |
| 5,700,999 A | * | 12/1997 | Streicher et al. | 235/381 |
| 6,024,142 A | * | 2/2000 | Bates | 141/94 |
| 7,650,300 B2 | | 1/2010 | Darvish et al. | |
| 2006/0076408 A1 | * | 4/2006 | Phillips et al. | 235/385 |
| 2006/0111851 A1 | * | 5/2006 | Potgieter et al. | 702/35 |

* cited by examiner

*Primary Examiner* — Michael G Lee
*Assistant Examiner* — Suezu Ellis
(74) *Attorney, Agent, or Firm* — Paul B. Heynssens Attorney at Law, PLC

(57) ABSTRACT

A fuel management system for use by operators of temporary and/or permanent inventories of vehicles such as vehicle dealerships. Fuel vouchers are issued by authorized issuing personnel to authorized recipients if a validation procedure is passed using a database incorporating employee and vehicle inventory information. At the time of delivery, the fueling station will verify the vehicle and individual presenting the voucher. If verification occurs, the authorized quantity of fuel is dispensed. The voucher and sales receipt are returned to the dealership for future auditing and report generation. The system stores information to enable reports to be generated concerning fuel voucher issuance, actual fuel usage and to detect fraud or misuse, allowing more effective fuel expense management. In the event a report generates a fraud alert, appropriate management personnel are immediately notified by email, text messaging or other means.

22 Claims, 9 Drawing Sheets

SYSTEM AND METHOD FOR MANAGING AND MONITORING THE DISPENSING OF FUELS

CROSS-REFERENCE IS MADE TO RELATED APPLICATION

This application is based on U.S. Provisional Patent Application Ser. No. 61/008,982, filed Dec. 20, 2007, of the same title.

FIELD OF THE INVENTION

The present invention relates to a system and method for managing the dispensing of fuels to inventoried fleet vehicles and non-inventoried vehicles at a fueling location which provides validation, issuance of vouchers, auditing, reporting and indicators to control fraud and unauthorized fuel delivery.

BACKGROUND OF THE INVENTION

Owners and operators of fleet vehicles such as vehicle dealerships often have programs which allow vehicles to be fueled at offsite authorized refueling stations. A problem common to these dealerships is the management and control of fuel delivery so that fuel is delivered only to authorized vehicles, authorized drivers and in authorized quantities. If effective controls are not in place, abuses and fraud may occur adding substantially to the fuel costs of the dealership operators, particularly in view of today's high fuel costs.

Various systems can be found in the prior art which are intended to monitor and control the delivery of fuel at offsite refueling stations. These systems include use of identifying bar codes or RFID tags associated with vehicles which are to be refueled. Other systems will require the entry of a PIN number for processing via point-of-sale authorization controller. However, most of these systems are not fully effective as they do not provide validation and confirmation prior to and at the time of fuel delivery along with features such as auditing and reporting for administration and fraud detection. Further, these systems do not adequately provide for controls as to both inventoried and non-inventoried vehicles.

BRIEF SUMMARY OF THE INVENTION

Briefly, the present invention provides a fuel management system for vehicle dealerships which have a number of vehicles which require fueling at an authorized, offsite fueling location. The system additionally provides fuel management for inventoried vehicles as well as non-inventoried vehicles, as for example, vehicles at the dealership for maintenance.

The present system is a computer-based system which receives information and data concerning the authorized vehicles to be refueled, authorized issuers, and authorized recipients. This data can be extracted from the dealership's computerized management system or may be manually entered. An authorized individual or issuer can log onto the system and initiate the fuel voucher generation process. The issuer enters the appropriate information such as the vehicle stock or VIN number, vehicle mileage, as well as the identification of the individual recipient of the voucher. A purchase limit may also be imposed. If the validation requirements are passed, a fuel voucher will be issued and be given to the authorized recipient.

The recipient of the voucher will then proceed to redeem the voucher at a designated fueling station. At the time of delivery, the station attendant will confirm the validity of the voucher, verify that the vehicle is the vehicle indicated on the voucher for refueling and confirm the identity of the recipient. Once validation is complete, the fuel station attendant redeems the voucher for an amount not exceeding the approved amount appearing on the voucher. The fuel voucher receipt, along with the purchase receipt, is returned to the dealership for auditing.

The fuel management delivery system of the present invention also provides fuel voucher and gas receipt auditing. An auditor may access the system and scan or hand enter the bar coded fuel voucher number and the fuel charge from the fuel station receipt. The system verifies the voucher number is correct and indicates whether the voucher has previously been audited. If the voucher meets the verification criteria, the system stores this information for future reference and reporting. Information stored in the system can then be utilized to provide periodic reports on fuel voucher issuances and actual fuel usage. These reports can be filtered by department, issuer, recipient fueled, vehicle or an arbitrary reference number. Additionally, reports are available in a graphical representation, as well as specific reports that use an algorithm for searching data designed to locate potential fraud or misuse, such as multiple fills per stock number, non-stock fueled vehicles, out-of-sequence mileage and fuel costs exceeding an authorized amount.

Access to the information stored in the fuel management system is available to authorized individuals of the dealership such as a supervisor, management and accounting personnel. Users authorized to issue vouchers, conduct audits or generate reports are updated on an as-needed basis by the dealership's management. The fuel management system is periodically updated to maintain the current list of authorized vehicles and authorized recipients.

BRIEF DESCRIPTION OF THE DRAWINGS

The above and other advantages and objects of the present invention will become more apparent when taken in conjunction with the following description, claims and drawings in which:

DETAILED DESCRIPTION OF THE DRAWINGS

Figure 1:
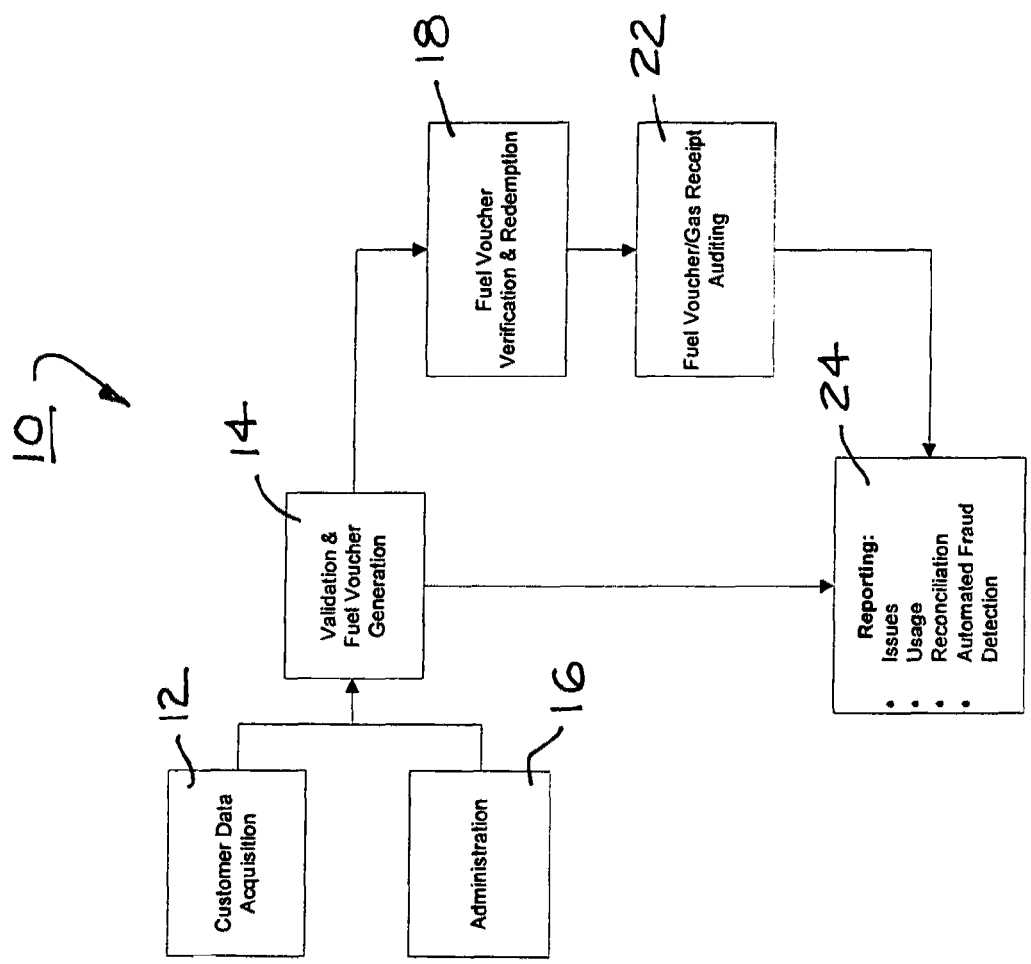
FIG. 1 is a schematic illustrating the system overview of the fuel management system of the present invention.

Turning now to the drawings, FIG. 1 shows an overview of the fuel management system of the present invention. The fuel management system is intended for use by operators having temporary and/or permanent inventories of vehicles, such as a vehicle dealership or fleet. Vehicle dealerships must fuel three classes of vehicles: (1) Permanent stock which consists of a small permanent fleet of fixed asset vehicles, such as courtesy vans, parts-transport trucks and various other fueled vehicles for the day-to-day operations; (2) Stock vehicles which consist vehicles in inventory, which stock is temporary and turns over; and (3) Non-stock vehicles which are non-inventoried vehicles, such as vehicles that have arrived at the dealership and have not yet been entered as stock inventory in the dealership's management system and vehicles placed at the dealership for maintenance purposes. The collective list of stock vehicles and permanent stock vehicles is known as the "Inventory." "Non-stock issues converted to stock" refers to fuel voucher issues that were originally issued to vehicles that had not yet been entered into to the customer's computerized management system, but required fuel. However, once these vehicles enter into the dealership's computerized management system, these non-stock fuel voucher issues convert, automatically during periodic data extraction or manual upload, to stock issues in the fuel management system. Because dispensing of fuel to non-dealership owned vehicles warrants additional attention, this conversion of non-stock vehicles establishes that these fuel vouchers were, in fact, issued to non-dealership owned vehicles during reporting methods.

Vehicle dealerships and fleet operators are representative of the type of operator that would utilize the system of the present invention. The term "dealership" is used herein to describe the system since the system has primary application to such operations but it is understood that the term "dealership" includes any business entity having permanent and non-permanent vehicle inventory which entity must manage fuel dispensing such as fleet operators, contractors, trucking companies and the like. An "issuer" refers to an employee or other individual who utilizes the system to issue a fuel voucher. A "recipient" refers to an individual, such as an employee, to whom a voucher for fuel to be purchased is issued. The compilation of valid recipients resides in the "active employee list." There are multiple levels of administrative privileges in the system. An "auditing user" or a "reconciling user" is an administrator authorized to reconcile fuel station receipts to issued vouchers. A "reporting user" is an administrator authorized to generate reports from stored information in the system for the purpose of accounting, fuel usage analysis, and the detection of misappropriation or fraud. An "administrative user" has all administrative privileges, including the ability to add or edit issuers and issuer privileges, add or edit auditing users, add or edit reporting users, and add or edit other administrative users.

The fuel management system 10 utilizes dealership data 12 to validate and generate fuel vouchers 14 by authorized administration 16. Once the vouchers 14 are verified, they are redeemed at 18. The system provides for auditing at 2 and issuance of various input at 24.

Figure 2:
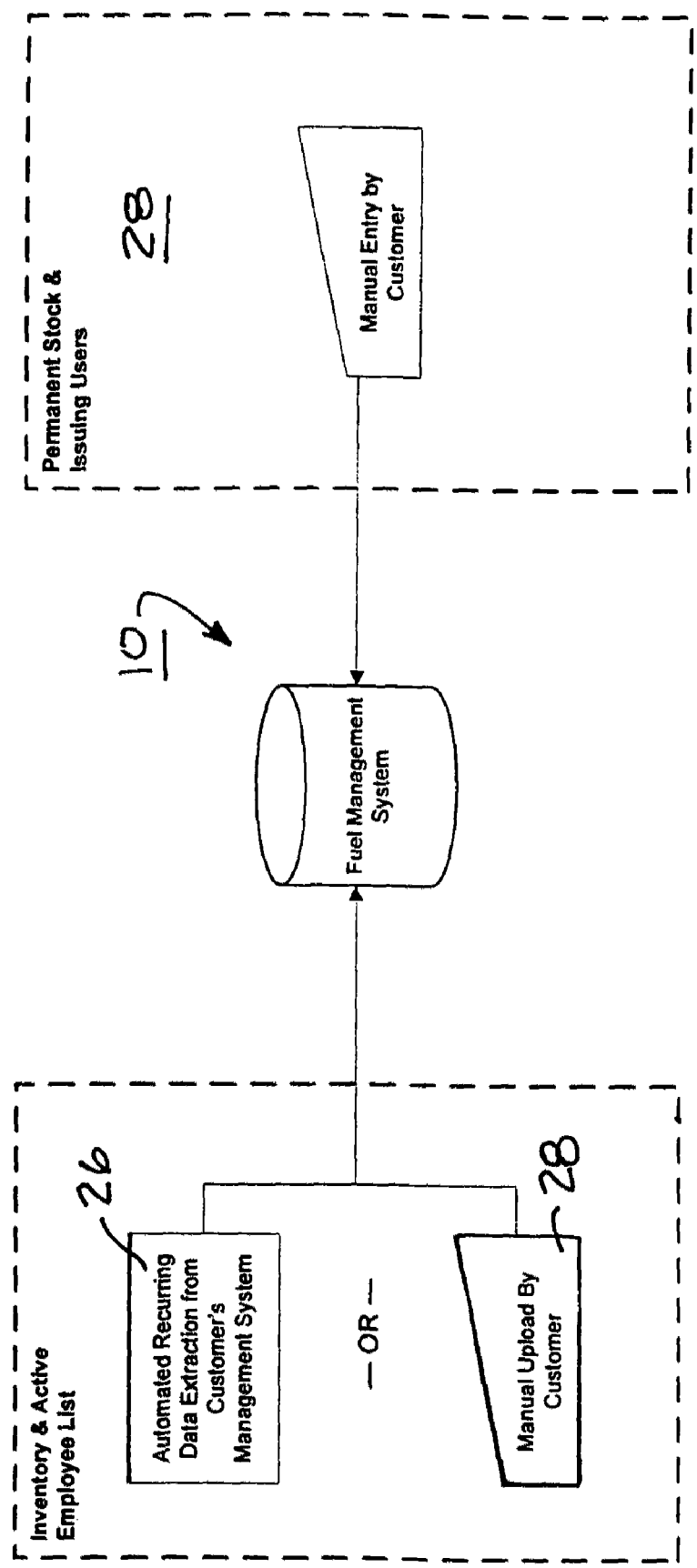
FIG. 2 is a schematic illustrating customer data acquisition in the fuel management system of the present invention.

As seen in FIG. 2, the present invention is a computer based system that stores and utilizes several types of data.

Certain classes of data are periodically updated for use in the verification and validation procedures. The stock vehicle list and the active employee list are regularly updated, such as daily, either by automated extraction from the dealership's computerized management system 26, or by manual upload to the fuel management system at 28. When vehicles are sold or otherwise removed from the dealership's inventory database the corresponding entry is removed from the fuel management system. Likewise, if a valid recipient, such as an employee, is terminated or separates from the organization, as reflected in the dealership's employee database, the employee is removed from the fuel management system's active employee list. Information stored for stock vehicles includes stock number, VIN (vehicle identification number), and other indicia such as vehicle manufacturer, vehicle model, year of manufacture, and vehicle color. Information stored for valid recipients includes full name and employee ID number or driver's license number.

Other types of data 28 are updated on an as-needed basis; the permanent stock list, issuers, auditing users, reporting users, and administrative users fall into this category and may be manually entered into the system 10. The present invention provides interactive computer consoles for administrative users of the fuel management system to enable them to make these updates. Information stored for the permanent stock list includes identifying stock number, VIN (vehicle identification number), and other indicia such as vehicle manufacturer, vehicle model, year of manufacture, and vehicle color. Information stored for issuers includes the individual's full name, employee ID, user name, password, whether the user is authorized to issue fuel vouchers. If the issuer is authorized, the maximum dollar amount per issued fuel voucher and maximum number of fuel voucher issues per day is set forth as well as the department of the issuer.

Figure 3:
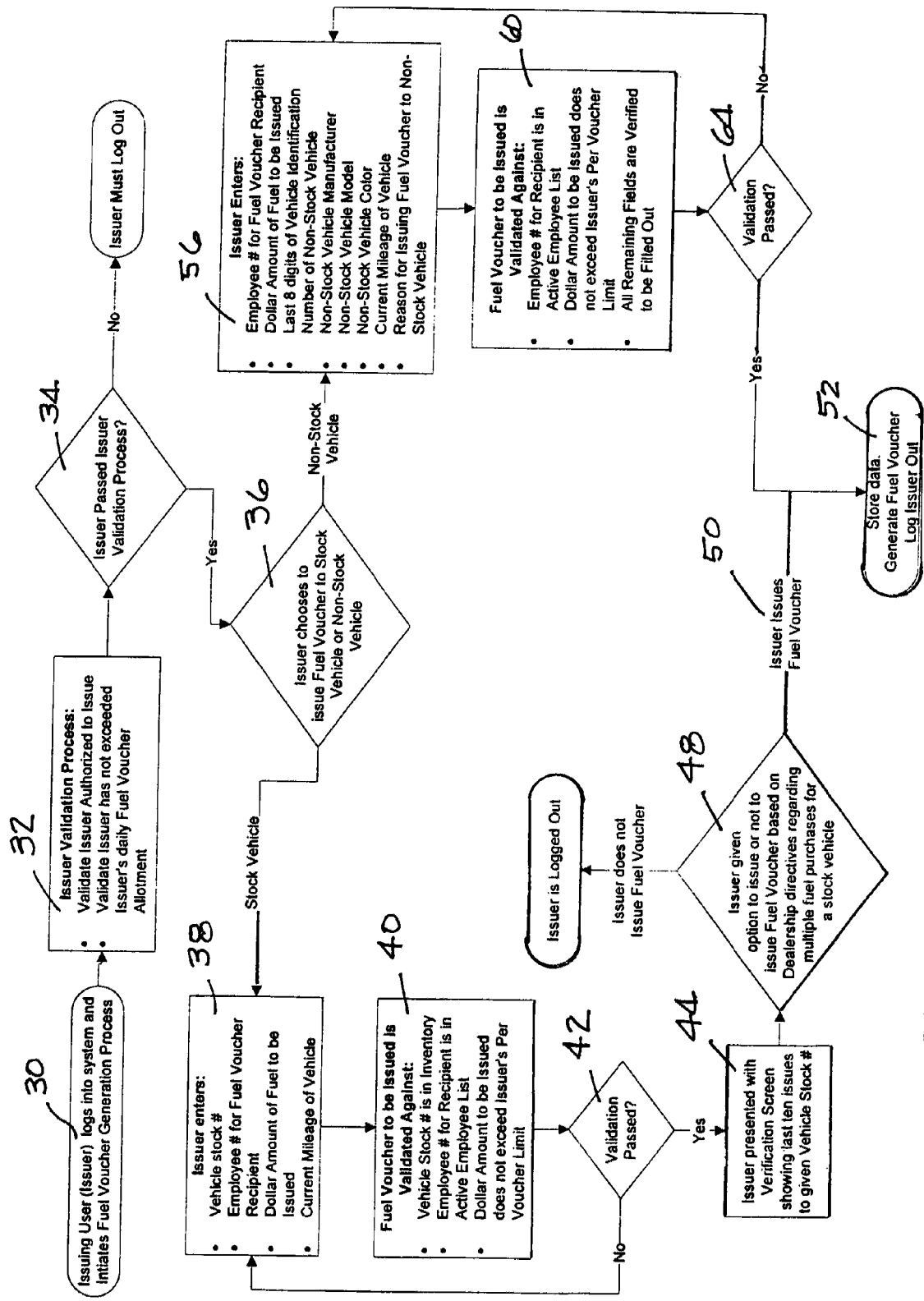
FIG. 3 is a schematic illustrating the validation and fuel voucher generation in accordance with the fuel management system of the present invention.

Referring to FIG. 3, an authorized issuer 30 logs into system and initiates the fuel voucher generation process using an assigned user login name and password. The system initially at 32 confirms the person logging on is authorized to issue fuel vouchers. As a safeguard, an administrative user may establish a periodic fuel voucher allotment for individual issuers. Accordingly, the system will next validate that the issuer has not exceeded fuel voucher allotment for the designated period of time. If the individual issuer passes the validation process, the voucher issuing procedure continues. If the issuer fails to pass the validation, the issuer must logout. Assuming that the issuer passes the validation process at 34, the issuer will then indicate whether the vehicle is a stock vehicle or a non-stock vehicle at step 36.

Figure 9A:
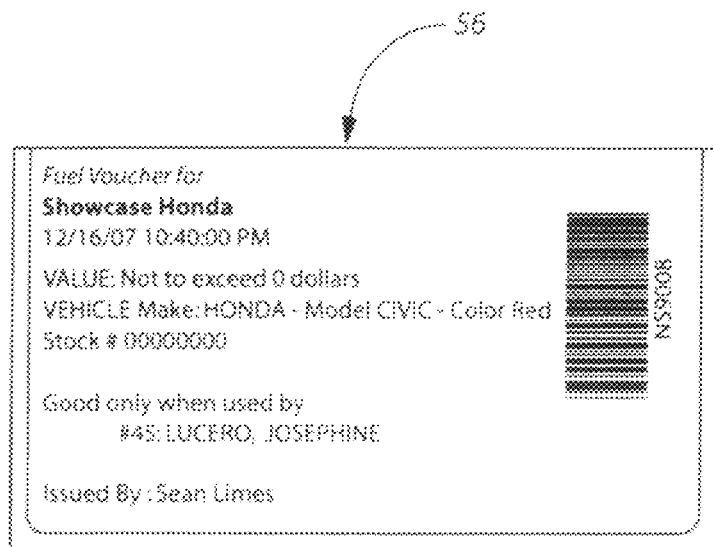
FIG. 9A illustrates a representative fuel voucher for a permanent stock vehicle.
Figure 9B:
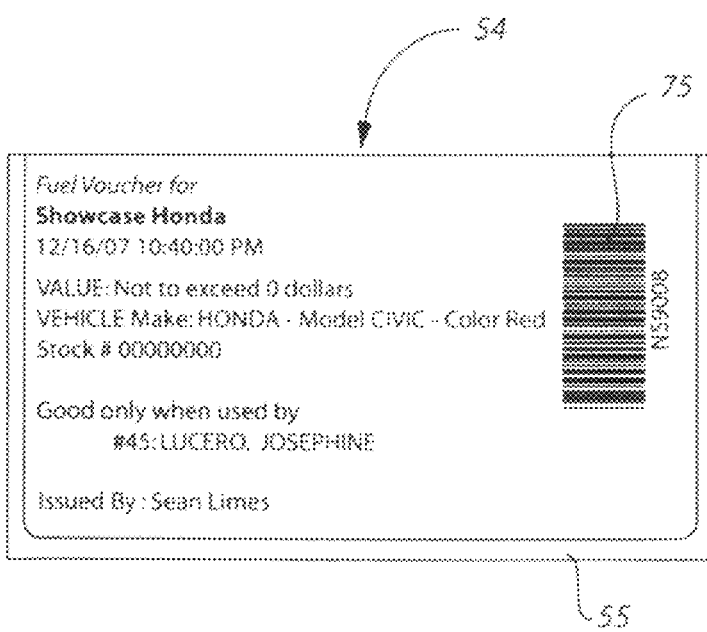
FIG. 9B illustrates a representative fuel voucher for an inventory vehicle.

If the vehicle is a stock vehicle, the issuer will proceed by entering the vehicle stock number, the vehicle mileage and identifying the fuel voucher recipient and the maximum dollar amount to be issued at 38. The fuel voucher to be issued is validated at 40 that the vehicle stock number is in inventory. The identification of the recipient will also be validated confirming that the recipient is authorized to receive and redeem vouchers and that the dollar amount to be issued does not exceed the issuer's voucher limit. If the validation process is passed at 42, the issuer is presented with a verification screen at 44 showing recent voucher issues for the particular vehicle stock number. The individual issuer is then given the option at 48 to issue a fuel voucher or not issue a fuel voucher based on user policies and directives regarding multiple fuel purchasers for a stock vehicle. If the issuer determines not to issue the fuel voucher, the issuer logs out. If the validation process has been passed and the issuer opts to issue a voucher, the issuer proceeds and a fuel voucher is issued to the recipient at 50. The data is stored and the issuer is logged out at 52. At this point, the authorized recipient is in possession of a fuel voucher for the purchase of a pre-determined quantity of fuel at a remote offsite fueling station. Representative fuel vouchers 54, 56 are shown in FIGS. 9A and 9B.

Referring to FIG. 3, if the voucher is to be issued for a non-stock vehicle, additional information is required at 56. The issuer must identify and validate the individual fuel voucher recipient along with a dollar amount of fuel to be issued at 60. The issuer must also enter appropriate information relating to vehicle identification such as all or a portion of the VIN number of the non-stock vehicle and other information such as the vehicle mileage, manufacturer, model and color, along with a reason for issuing a fuel voucher to a non-stock vehicle, such as the non-stock vehicle has not yet entered inventory or belongs to someone other than dealership, but is authorized per dealership policy for fueling. In order to encourage compliance and minimize abuses, the dealership may assess penalties such as monetary penalties if information entered into the validation process is inaccurate or if an individual attempts to subvert the system in order to obtain an unauthorized fuel voucher. In the case of a non-stock vehicle if the validation process is passed at 60, the issuer will be presented with a verification screen showing all of the vouchers issued for the particular stock number. A fuel voucher will be issued if validation is passed at 64 and the data entered is stored and the issuer is logged out at 52. At this point, the authorized recipient is in possession of a fuel voucher for the purchase of a pre-determined quantity of fuel at a designated offsite fueling station. A representative fuel voucher for a stock vehicle is shown in FIG. 9A and a representative fuel voucher for an inventory vehicle is shown in FIG. 9B. Preferably, the vouchers are printed by specialty printers using tamper-resistant, adhesively-backed stock.

Figure 4:
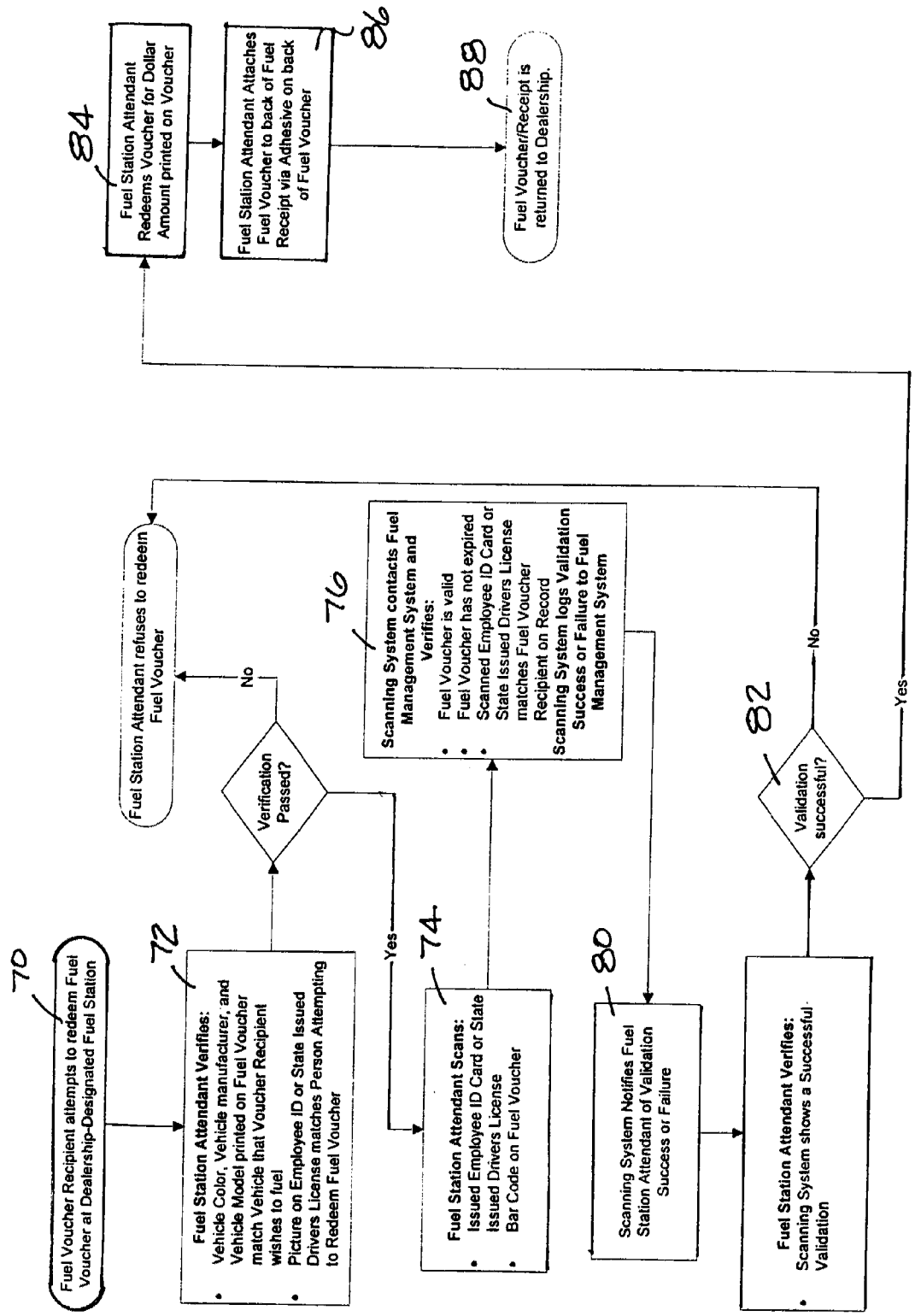
FIG. 4 is a schematic diagram showing fuel voucher verification and redemption.

The recipient will then proceed to drive the vehicle to a fueling station to obtain fuel. The fuel voucher verification redemption procedure is shown in FIG. 4. The voucher recipient will present a fuel voucher to the attendant at a designated fuel station at 70. The attendant will verify certain information at 72 such as the vehicle by color, model, manufacturer, VIN or other identifying information. The identity of the recipient presenting the fuel voucher will also be confirmed at 74 using suitable identification such as a state issued driver's license with a photo or employee badge bearing a photograph of the employee. If the verification procedure is not passed, the fuel station attendant will refuse to redeem the fuel voucher. If visual verification has been made by the attendant, the next step in the verification process occurs. In the system of FIG. 4, the fuel voucher, such as voucher 54, is provided with a bar code 75 which can be read by a scanning system at the fueling station. The scanning system will confirm the fuel voucher is valid and has not expired. In addition, the attendant will also scan the identification card presented by the voucher recipient to confirm the identity of the individual to whom the fuel voucher was issued. The scanning system 76 will log the validation as successful or failed to the fuel management system. The scanning system 76 will also notify the attendant of the validation success or failure at 80. If the scanning system indicates a successful validation at 82, the fuel station attendant will redeem the voucher at 84 up to the dollar amount indicated on the voucher. If the validation procedures performed by the scanning system indicates an error or failure, the fuel station attendant will refuse to redeem the fuel voucher. In the event fuel is delivered, the fuel station attendant will then attach the fuel voucher to the back of the fuel receipt, preferably using an adhesive backing provided on the voucher as shown in 86. The fuel voucher and receipt is returned to the dealership, preferably on a daily basis for auditing and reporting purposes.

Figure 5:
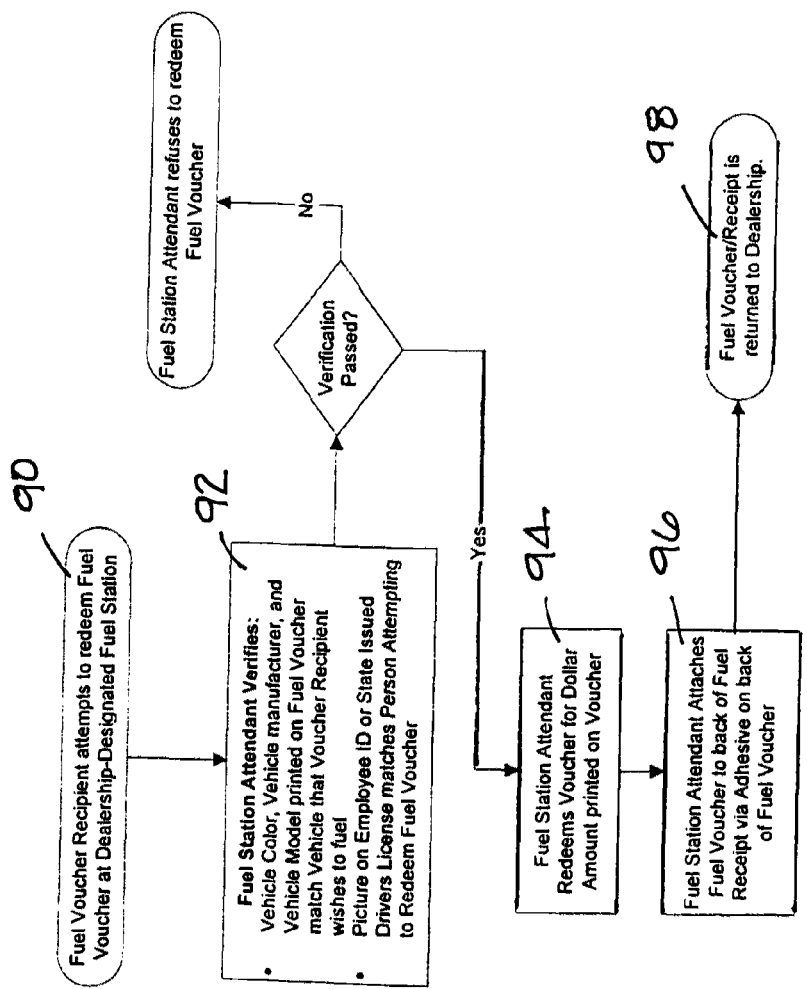
FIG. 5 is an alternate method of fuel voucher verification redemption according to the present invention.

FIG. 5 shows an alternate fuel voucher verification and redemption procedure. Again, the fuel voucher recipient will present the fuel voucher at the designated approved fueling station at 90. At the station, the attendant will be given the fuel voucher and the attendant will visually identify the vehicle by color, model, manufacturer, model, VIN or other appropriate identifying information and confirm that the vehicle is the vehicle identified on the voucher as seen at 92. The station employee will also confirm that the individual recipient presenting the voucher is, in fact, authorized to redeem the voucher by confirming identification using the recipient's photo ID, driver's license or other identification such as an employee badge bearing the recipient's photo, name and badge number. If the vehicle and the recipient conform to the information on the fuel voucher, the fuel attendant will redeem the voucher for fuel not exceeding the dollar amount indicated on the voucher at 94. If the verification check is not passed, the attendant will refuse to redeem the voucher. In the event the voucher is redeemed and fuel delivered, the fuel attendant at 96 will attach the fuel voucher to the fuel receipt, preferably using the adhesive provided on the fuel voucher covered by a peelable backing 55. The fuel voucher and attached receipt is returned by the refueling station to the dealership, preferably on a daily basis for auditing and reporting purposes at 98.

Figure 6:
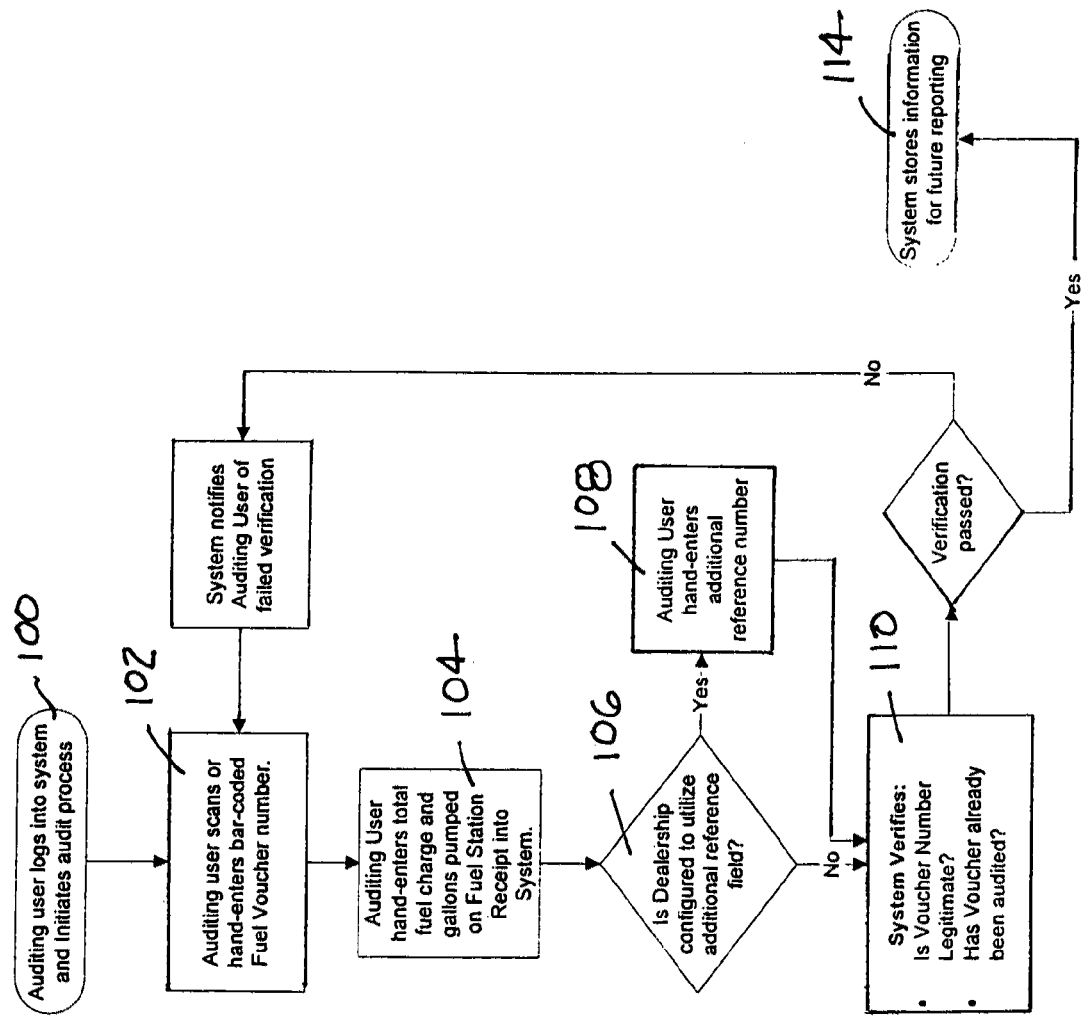
FIG. 6 is a schematic diagram illustrating fuel voucher and gas receipt auditing procedures.

Referring now to FIG. 6, fuel voucher auditing will generally be performed by an auditor, a member of management personnel or an individual in accounting. Those auditors authorized to access and initiate the auditing process will be identified in the administration database. The auditor will logon to the system and initiate an auditing process at 100. The auditor will have been provided fuel vouchers received from the authorized fueling station. The auditor will then scan or hand-enter the coded fuel voucher number at 102. The auditing proceeds at 104 with the auditor entering the total fuel charges and gallons purchased on the receipt received from the fueling station. If the fuel management system 10 is configured to utilize additional reference fields at 106, the auditor may enter an additional reference number at 108. The auditing proceeds with verification at 110 confirming the fuel voucher number is valid and indicating whether the fuel voucher has been previously audited. If the verification is passed at 112, the fuel management system stores the information at 114 for future reporting. If an error during the verification process is noted and verification fails, the system notifies the auditor of the failed verification. If the failure appears to be a result of an improper entry, the auditor may retry the audit procedure again scanning or hand-entering the fuel voucher number and the fuel charge.

Figure 7:
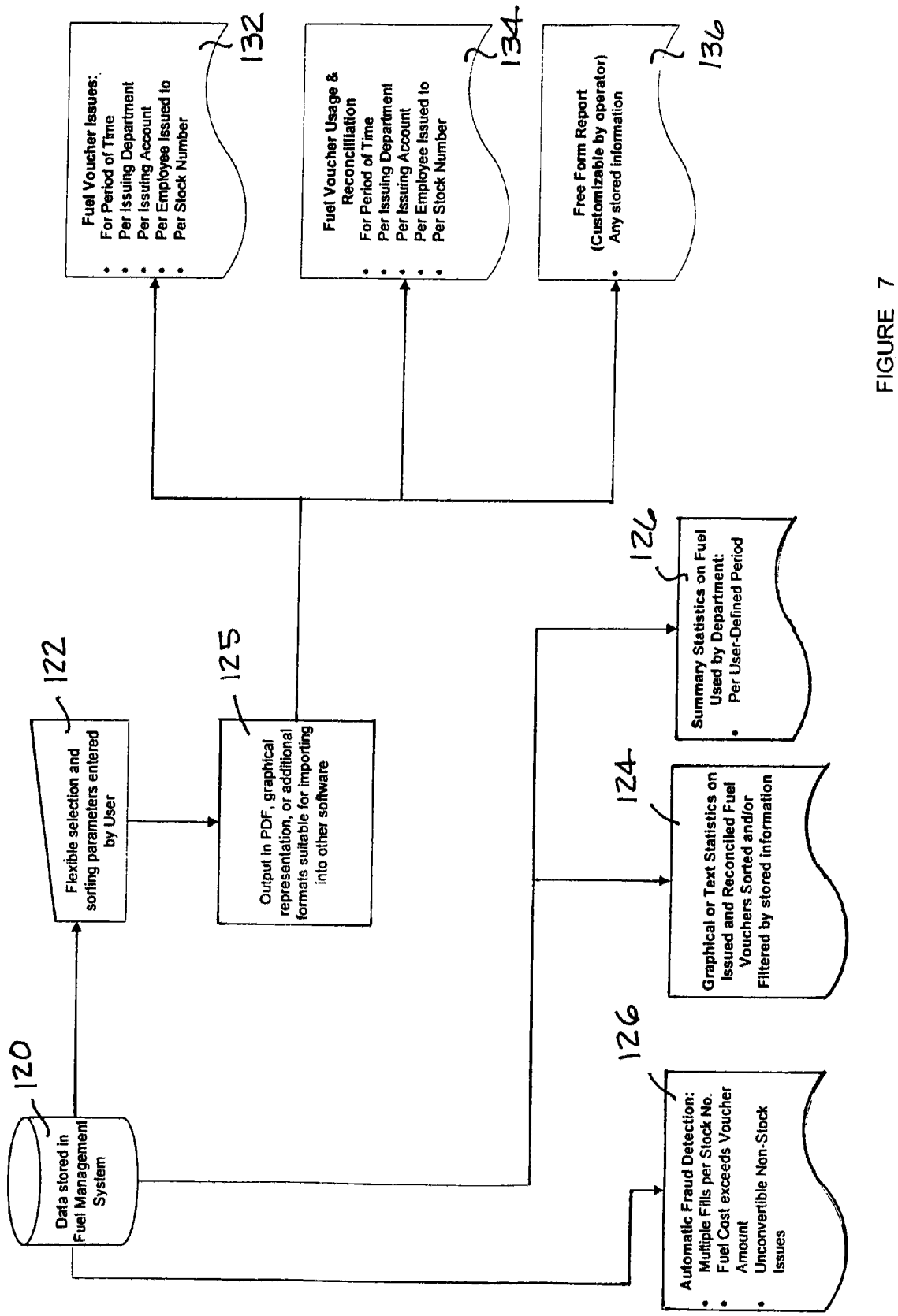
FIG. 7 is a schematic illustrating the reporting features of the fuel management system of the present invention.
Figure 8:
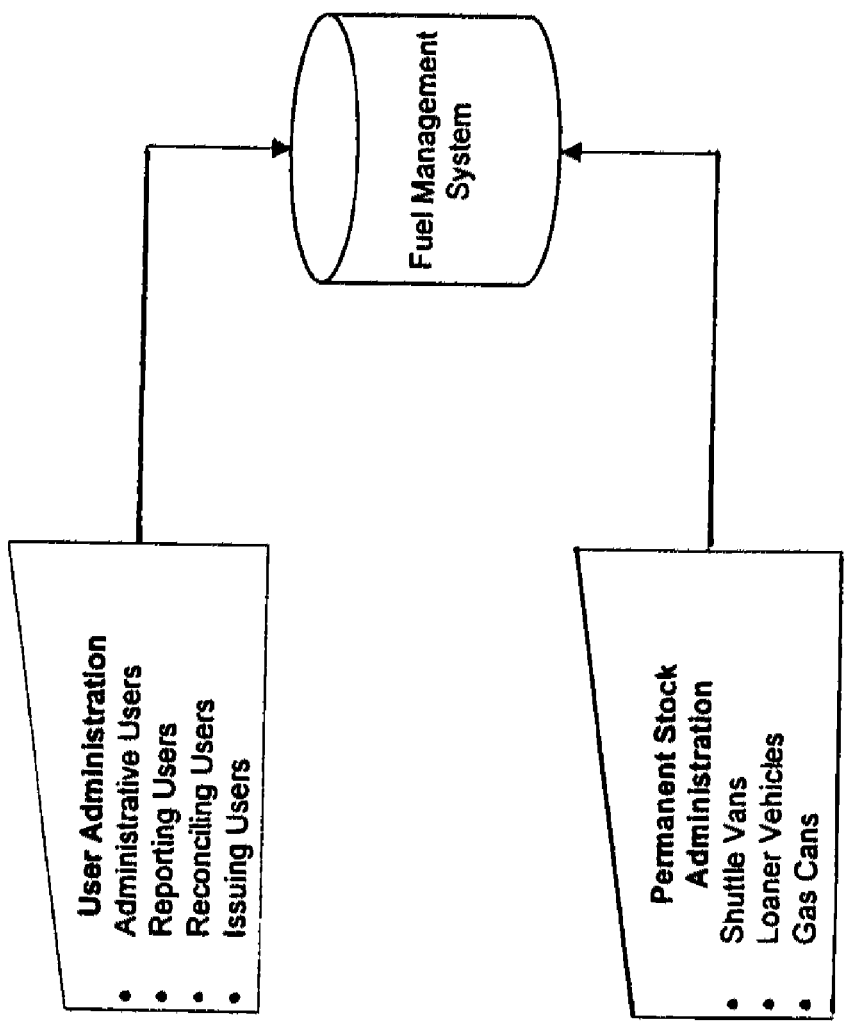
FIG. 8 is a schematic showing the overall administration of the fuel management system of the present invention.

The fuel management system 10 of the present invention may be used to provide a number of detailed reports for accounting, fuel usage and fraud detection purposes. Referring to FIG. 7, the information obtained in the issuing of fuel vouchers, fuel delivery, and reconciliation during auditing process, is stored at 120 in the system and is available for reporting, accounting, analysis, and automated fraud detection.

Basic reporting may be sorted and/or filtered by any field of sorting at 122 such as date/time issued, date/time reconciled, voucher ID, issuer, employee number, stock number, VIN, amount issued, amount reconciled, make, model, color, optional reference fields, gallons, dispensed and vehicle mileage. All information is stored by the fuel management system and used to generate pre-defined reports as well as user-defined reports 125. The results of reporting queries may be displayed in text, graphical format, or results may be delivered in additional formats suited for other software or systems. The reporting may include summaries by department or other operating divisions at 126 and by other reports as shown at 132, 134 and 136.

The fuel management system 10 of the present invention automatically detects indicators of fraud or misuse at 126 through several algorithms designed to search for these indicators in the data stored in the fuel management system. The operator is notified of these indicators through explicitly generated reports and/or active notification methods such as email, text messaging or other means of electronic notification. These indicators, such as exceeding a dealership-established threshold of multiple fills to a single stock vehicle, vouchers issued with out-of-sequence mileage entries, reconciled fuel station receipts which exceed the dollar amount of the associated fuel voucher, or fuel vouchers issued to non-stock vehicles that exceed the time limit to convert to stock issues, are designed to significantly increase customer efficiency and effectiveness in policing fuel theft or misappropriation.

The following are representative reports that are available to a dealership using the data collected and stored by the fuel management system 10 of the present invention. Fraud indicators are an important feature in monitoring fuel costs and deterring misuse.

1. Fraud Indicator: Multiple Fills Per Stock Number

There are two standard practices that dealerships follow when fueling inventory vehicles. The first practice is to completely fill the vehicle upon entry into inventory followed by a subsequent topping-off of the tank at the time of delivery to the customer. An alternative practice is to put a minimum of fuel in the vehicle when the inventory is received, followed by a complete fill at the time of delivery to the customer. Depending on the method used and the number of times a given vehicle is demonstrated to a customer, a standard deviation of fills-per-vehicle can be derived. The multiple fills per stock number fraud indicator allows dealership management to establish a threshold of fills-per-vehicle consistent for that dealership's practices. In the event the threshold is exceeded, an exception is generated by the system. An active alert immediately notifies management of the occurrence of an exception and includes a complete fuel history for the particular stock number. Additionally, a report is available on demand showing all of the exceptions and fuel histories for those exceptions that occur within a given time period.

2. Fraud Indicator: Unconvertible Non-Stock Issues

As previously mentioned, standard practices and procedures often result in situations in which vehicles requiring fuel have not yet been entered as stock items into the dealership's computerized management system. Non-stock issues that are not converted to stock issues within a preestablished time period are considered "unconvertible non-stock issues." These exceptions warrant additional scrutiny to ensure the legitimacy of the fuel issuance and to assist in the proper enforcement of the dealership's policy. The unconvertible non-stock issues fraud indicator provides detailed information on unconvertible non-stock issues to the dealership. Active alerting methods periodically notify management when non-stock issues become unconvertible. Additionally, a report is available on demand that shows all of the unconvertible non-stock issues occurring within a given time period.

3. Fraud Indicator: Out-of-Sequence Mileage

When an issuer issues a fuel voucher, current mileage of the vehicle to be fueled is entered into the fuel management system. The out-of-sequence mileage fraud indicator searches the vehicle's fuel history of the vehicle to be fueled to verify that the reported mileage has been sequentially recorded. Should inconsistencies exist, this is a "flag" that an improper issuance has been requested or is being requested and an exception is generated. Active alert methods immediately notify management of the exception and will include a complete fuel history for that stock number. Additionally, a report is available on demand that shows all of the exceptions and fuel histories for those exceptions occurring within a given time period.

4. Fraud Indicator: Total Dollar Amount Per Stock Number Exceeds Threshold

As mentioned above, there are standard practices that dealerships follow to fuel vehicles in inventory. The first involves a complete filling upon receiving the inventory with a subsequent topping-off of the tank at the time of delivery to the customer. An alternative practice is to put a minimum of fuel in the vehicle when the vehicle is received in inventory, followed by a complete fill at the time of delivery to the customer. Depending on the dealership's practice and the number of times a given vehicle is demonstrated, a standard deviation of total dollars issued per vehicle can be derived. The total dollar amount per stock number exceeds threshold fraud indicator allows dealership management to establish a threshold of total dollars issued per vehicle appropriate with that dealership's practices. In the event this threshold is exceeded, an exception is generated. Active alert methods immediately notify management of the exception and include a complete fuel history for the particular stock number. Additionally, a report is available on demand that shows all of the exceptions and fuel histories for those exceptions occurring within a given time period.

5. Fraud Indicator: Fuel Cost Exceeds Voucher Amount

As previously mentioned in the reconciliation process, upon the return of a voucher from the operator authorized fueling station, the voucher number, dollar amount of purchase and gallons of fuel pumped is entered into the fuel management system. If the dollar amount of purchase exceeds the amount issued, this indicates an unauthorized quantity of fuel has been dispensed by the authorized fueling station. The fuel cost exceeds voucher amount fraud indicator detects these exceptions and immediately alerts dealership management utilizing active alert methods. Additionally, a report is available on demand that shows all of the exceptions that occur within a given period of time.

From the foregoing, it will be apparent that the present invention provides an effective fuel management system for both inventoried and non-inventoried vehicles which provides valuable controls, auditing and fraud detection procedures.

It will be obvious to those skilled in the art to make various changes, alterations and modifications to the invention described herein. To the extent such changes, alterations and modifications do not depart from the spirit and scope of the appended claims; they are intended to be encompassed therein.

I claim:

1. A method for managing a dispensing of fuel to inventoried stock vehicles in a vehicle fleet comprising:

(a) providing a computer database containing the stock vehicles' identifying information, individuals authorized to issue fuel purchase vouchers, and individuals authorized to receive fuel purchase vouchers;

(b) entering a request by an issuer on a computer to initiate the fuel voucher generation process to a voucher recipient;

(c) using the database to validate that the issuer is authorized to issue a fuel voucher;

(d) entering the identification of the vehicle, the identification of the intended voucher recipient, and the amount of fuel to authorize for purchase;

(e) validating the vehicle and recipient using the database;

(f) issuing a fuel voucher to the voucher recipient setting forth the authorized purchase, and the identification of the recipient, and the stock vehicle's identifying information;

(g) presenting the fuel voucher to a fueling location attendant;

(h) confirming the identification of the vehicle and the voucher recipient at the fueling station prior to fuel delivery;

(i) dispensing the fuel; and (j) recovering at least one voucher and at least one receipt for auditing subsequent to fuel delivery.

2. The method for managing the dispensing of fuel to inventoried stock vehicles in the vehicle fleet of claim 1 wherein the request includes the dollar amount of fuel and current mileage of the vehicle.

3. The method for managing the dispensing of fuel to inventoried stock vehicles in the vehicle fleet of claim 1 wherein validation confirms the vehicle is in inventory, the voucher recipient is a currently authorized voucher recipient and the voucher amount does not exceed established limits that are defined for each authorized user, and include a number of vouchers per day and a dollar limit per voucher.

4. The method for managing the dispensing of fuel to inventoried stock vehicles in the vehicle fleet of claim 1 wherein the voucher is tamper-resistant having an adhesive backing and wherein the voucher is attached to a fuel receipt.

5. The method for managing the dispensing of fuel to inventoried stock vehicles in the vehicle fleet of claim 1 wherein the database is derived from a computerized management system.

6. The method for managing the dispensing of fuel to inventoried stock vehicles in the vehicle fleet of claim 1 wherein the database contains information periodically updated by a manual process.

7. The method for managing the dispensing of fuel to inventoried stock vehicles in the vehicle fleet of claim 1 wherein the auditing confirms the voucher number, and includes recording a fuel charge and gallons of fuel from the fuel station receipt.

8. The method for managing the dispensing of fuel to inventoried stock vehicles in the vehicle fleet of claim 1 wherein the fuel voucher is bar coded and the confirmation of the voucher recipient and vehicle is obtained by scanning the bar code using a scanning appliance.

9. The method for managing the dispensing of fuel to inventoried stock vehicles in the vehicle fleet of claim 8 wherein the scanned information is transmitted for validation.

10. The method for managing the dispensing of fuel to inventoried stock vehicles in the vehicle fleet of claim 1 wherein information obtained and stored during fuel voucher generation process and subsequent auditing is used to provide an automated alert.

11. The method for managing the dispensing of fuel to inventoried stock vehicles in the vehicle fleet of claim 1 wherein the fuel station attendant confirms the identity of the fuel voucher recipient using a photo identification presented by the voucher recipient to visually confirm the identification of the vehicle fueled by utilizing information printed on the voucher.

12. The method for managing the dispensing of fuel to inventoried stock vehicles in the vehicle fleet of claim 1 further comprising:

setting a threshold of maximum legitimate fuelings;

generating an exception when the threshold of maximum legitimate fuelings is exceeded; and displaying the exception as a scheduled automated periodic report, on-demand report, or a report immediately delivered automatically to designated management personnel via electronic transmission.

13. The method for managing the dispensing of fuel to inventoried stock vehicles in the vehicle fleet of claim 12 in which electronic transmission is an SMS text message.

14. The method for managing the dispensing of fuel to inventoried stock vehicles in the vehicle fleet of claim 12 in which electronic transmission is an e-mail.

15. The method for managing the dispensing of fuel to inventoried stock vehicles in the vehicle fleet of claim 1 wherein a vehicle requiring fuel that has not yet entered the system's inventory may have fuel dispensed and where that vehicle's identifying information is automatically compared to the system's inventory for a period of time subsequent to fuel delivery and where an exception is generated if the fueled vehicle does not enter the system's inventory within the set period of time and where this exception can be displayed as a scheduled automated periodic report, on-demand report, or a report immediately delivered automatically to designated management personnel via electronic transmission.

16. The method for managing the dispensing of fuel to inventoried stock vehicles in the vehicle fleet of claim 15 in which electronic transmission is an SMS text message.

17. The method for managing the dispensing of fuel to inventoried stock vehicles in the vehicle fleet of claim 15 in which electronic transmission is an e-mail.

18. The method for managing the dispensing of fuel to inventoried stock vehicles in the vehicle fleet of claim 1 wherein a record of a given stock vehicle's mileage is recorded upon fuel purchase authorization and where an exception is generated if subsequent fuel purchase authorization records do not show sequential mileage increases and where this exception can be displayed as a scheduled automated periodic report, on-demand report, or a report immediately delivered automatically to designated management personnel via electronic transmission.

19. The method of managing the dispensing of fuel to inventoried stock vehicles in the vehicle fleet of claim 1, where a threshold of maximum dollars of fuel per inventoried vehicle can be set and wherein a total of recorded fuel purchases for an inventoried vehicle exceeding this threshold generates an exception that can be displayed as a scheduled'automated periodic report, on-demand report, or a report immediately delivered automatically to designated management personnel via electronic transmission.

20. The method of managing the dispensing of fuel to inventoried stock vehicles in the vehicle fleet of claim 1 further comprising reconciliation where fuel receipts from a gas station are reconciled against records of fuel purchase vouchers issued by the system and where an exception is generated if the receipted amount is more than the amount authorized in the fuel purchase voucher and where this exception can be displayed by automated periodic report, on-demand report, or a report immediately delivered automatically to designated management personnel via electronic transmission.

21. The method for managing the dispensing of fuel to inventoried stock vehicles in the vehicle fleet of claim 1, wherein the request includes the amount of fuel requested and a current mileage of the vehicle.

22. The method for managing the dispensing of fuel to inventoried stock vehicles in the vehicle fleet of claim 1 wherein the database contains information periodically updated by an automated process.

* * * * *